United States Patent [19]

Ishikawa

[11] 4,051,745

[45] Oct. 4, 1977

[54] MULTIPLE-CONTACT TYPE W-N GEAR

[75] Inventor: Shoichi Ishikawa, Yokohama, Japan

[73] Assignee: Kabushiki Kaisha Hasegawa Haguruma, Tokyo, Japan

[21] Appl. No.: 677,216

[22] Filed: Apr. 15, 1976

[30] Foreign Application Priority Data

Apr. 16, 1975   Japan ............................... 50-45155
Oct. 30, 1975   Japan ............................... 50-129907

[51] Int. Cl.² ............................................. F16H 55/06
[52] U.S. Cl. .................................................... 74/462
[58] Field of Search .................................. 74/462, 457

[56] References Cited

U.S. PATENT DOCUMENTS 3,180,172   4/1965   Leggatt ............................... 74/462
3,855,874   12/1974  Honma ................................ 74/462

*Primary Examiner*—Alan Cohan
*Attorney, Agent, or Firm*—Oldham & Oldham Co.

[57] ABSTRACT

A single-flank or double-flank type W-N gear each of the convex or concave tooth flanks of which is formed of a plurality of circular arcs (which participate in meshing engagement and) the centers of which (arcs) are arranged on the pitch line or in the vicinity thereof in spaced-apart relation to each other and an intermediate curved line or lines interconnecting the circular arcs. Meshing contact at any instant is obtained at different locations mutually spaced in the direction of tooth trace and stress concentration at the root of the teeth is minimized.

14 Claims, 13 Drawing Figures

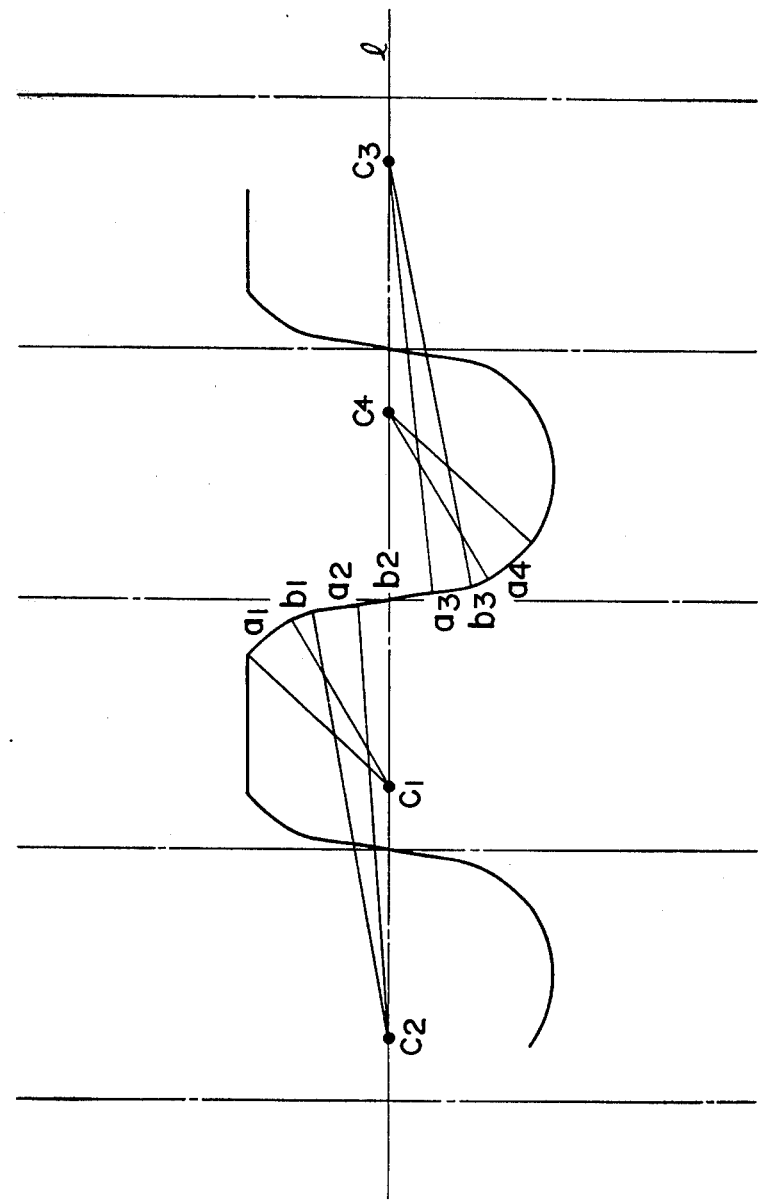

MULTIPLE-CONTACT TYPE W-N GEAR

BACKGROUND OF THE INVENTION

This invention relates to helical gears of the type known as W-N (Wildhaver-Novikov) gears.

Generally, W-N gears are either of the single-flank or double flank form of tooth profile, taken in a transverse or normal reference plane. As is well known, one of two mating W-N gears of the single-flank form has teeth each formed on both sides thereof with a single convex flank while the other gear has teeth each formed on both sides thereof with a single concave flank. In the case of a pair of mating W-N gears of the double-flank form, both gears have teeth each formed on both sides thereof with a convex flank and a concave flank.

Meshing engagement of W-N gears of either form is effected between a convex and a concave flank, giving a substantial area of instantaneous meshing contact. Owing to this, they have a strength of tooth surface about two to three times as large as that of corresponding ordinary involute gears. They also excel involute gears on account of the bottom of tooth space defined by a single circular arc of substantial radius and accordingly reduced concentration of bending stress. On the other hand, in contrast to involute gears, which make meshing contact at any instant along a line of substantial length extending over the whole face width of teeth, conventional forms of W-N gear, having each tooth flank formed of a single circular arc or a curved line approximating a circular arc, only make localized meshing contact at most in two different positions along the line of tooth trace, one on the addendum portion of tooth surface.

This causes at the root of tooth a bending moment exhibiting peak values several times as high as those in the case of involute gears, giving a bending strength at most 1.5 times as large as that of involute gears. Thus, in some cases, particularly under very high loads, the gear life is limited largely by tooth breakage rather than by damage of tooth surface.

Further, the relatively high peak values of bending moment results in a substantial fluctuation of load on teeth as occurring with load transference between neighboring teeth and this causes more or less increase in noise and vibration, precluding any satisfactorily smooth power transmission particularly in high speed operations.

One prior art patent on W-N gears is U.S. Pat. No. 3,855,874 that shows double mesh type W-N gears that include gear teeth having profiles each including circular addendum and dedendum arcs connected by an intermediate straight line segment at the pitch line area.

SUMMARY OF THE INVENTION

The present invention is designed to overcome the difficulties encountered with conventional forms of W-N gear as described above without impairing the desirable characters of this type of gears to any extent and has for its object the provision of a W-N gear which is characteristically increased in the bending strength of its teeth.

Another object of the present invention is to provide a W-N gear which is operable at higher speeds with smoother load transference between neighboring teeth and thus with reduced load fluctuation.

A further object of the present invention is to provide a W-N gear which is increased in the strength of its tooth surface as well as in the bending strength of its teeth.

Yet another object of the present invention is to provide a W-N gear which is capable of smooth power transmission with a face width reduced compared with that required of conventional forms of W-N gear.

A further object of the present invention is to provide a W-N gear of the character described which has a tooth profile designed to exhibit further improved meshing characteristics.

According to the present invention, there is provided a W-N gear whose tooth profile, taken in a transverse or normal plane, includes a convex or concave flank formed of a plurality of circular arcs and an intermediate straight or curved line or lines interconnecting the circular arcs, the centers of the circular arcs being arranged on the pitch line or in the vicinity thereof.

According further to the present invention, there is provided a W-N gear of the character described in which the centers of circular arcs forming the tooth flank are arranged along the pitch line in the order of distance of the circular arcs from the adjacent end of the tooth flank so that any instantaneous contact of the tooth flank with that of a mating gear is made in a V form diverging in the direction of tooth trace.

According to a further feature of the present invention, there is provided a W-N gear which is characterized in that it has a tooth flank formed of a plurality, $n$, of circular arcs the centers of which are arranged along the pitch line at intervals of approximately $1/n$ the circular pitch of the gear and an intermediate curved line or lines interconnecting the circular arcs.

According to another feature of the present invention, there is provided a double-flank type W-N gear the tooth surface of which is comprised of a convex and a concave flank both formed of a plurality, $n$, of circular arcs whose centers are arranged along the pitch line at intervals of approximately $1/n$ of the circular pitch and an intermediate curved line or lines interconnecting the circular arcs and in which the distance between one of the centers of $n$ circular arcs of the convex flank which is closest to the set of centers of $n$ circular arcs of the concave flank and one of the centers of $n$ concave circular arcs which is closest to the set of centers of $n$ convex circular arcs is approximately equal to $1/n$ the circular pitch multiplied by an integer.

According to another feature of the present invention, there is provided a double-flank type W-N gear the tooth surface of which is comprised of a convex and a concave flank both formed of a plurality, $n$, of circular arcs whose centers are arranged along the pitch line at intervals of approximately $1/n$ the circular pitch and in which the distance between one of the centers of $n$ circular arcs of the convex flank which is closest to the set of centers of $n$ circular arcs of the concave flank and one of the centers of $n$ concave circular arcs which is closest to the set of centers of $n$ convex circular arcs is approximately equal to $1/n$ the circular pitch multiplied by an integer plus or minus $\frac{1}{2}n$ the circular pitch.

According to a further feature of the present invention, there is provided a W-N gear which has a tooth flank formed of a plurality of circular arcs and an intermediate curved line or lines interconnecting the circular arcs and in which the intermediate line or lines are characteristically desirable in form to obtain a required state of meshing engagement.

The above and other objects, features and advantages of the present invention will become apparent from the following description when taken in conjunction with the accompanying drawings.

BRIEF DESCRIPTION OF THE DRAWINGS

In the drawings:

FIG. 11 is a diagram similar to FIG. 9, showing the basic rack tooth profile of another form of W-N gear embodying the present invention;

DESCRIPTION OF THE PREFERRED EMBODIMENTS

In order to enable those skilled in the art readily to understand the present invention, description will first be made of an instantaneous state of tooth contact and that of distribution of bending moment obtainable, for example, with a convention form of double-flank type W-N gear under loaded condition, with reference to FIGS. 1 and 2.

Figure 1:
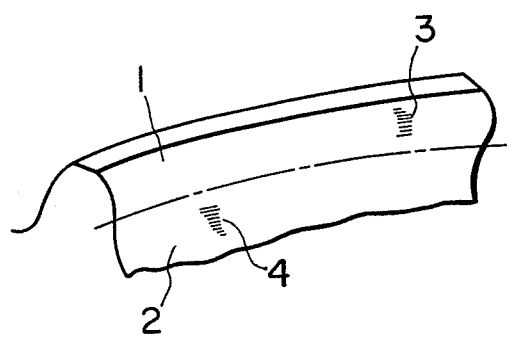
FIG. 1 is a fragmentary perspective view of a conventional form of symmetrical type W-N gear, illustrating an instantaneous state of meshing contact.
Figure 2:
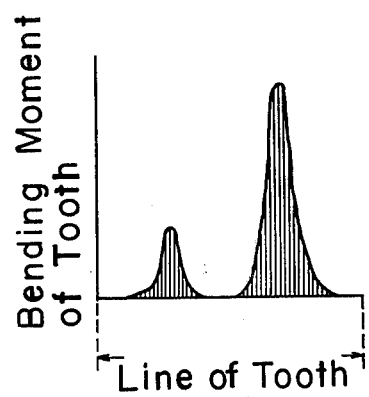
FIG. 2 graphically illustrates the manner in which the bending moment acting at the root of the load-transmitting tooth shown in FIG. 1 is distributed over the length of tooth trace.

As seen in FIG. 1, the conventional W-N gear has a tooth profile including two flanks 1 and 2 each formed of a single circular arc or curved line approximating a circular arc and the double-flank tooth surface makes contact at any instant of meshing engagement only at two locations, one on the convex flank and the other on the concave flank, as indicated at 3 and 4, respectively. And the contact at each of the two locations is in effect a point contact looking along the length of tooth trace. Under this situation, the bending moment acting on the tooth under load is distributed unevenly over the length of tooth trace, giving extremely high peak values at two points spaced apart from each other in the direction of tooth trace, as shown in FIG. 2.

W-N gears of such conventional form, therefore, are not so excellent in bending strength as in strength of tooth surface, compared with involute gears. Accordingly, where such W-N gears are placed under very large loads, their service life has often been determined by tooth breakage rather than by damage of tooth surface.

On the other hand, the high peak values of bending moment result in a substantial load fluctuation on individual teeth as the load is transferred successively between neighboring teeth. This has caused substantial noise and vibration and precluded any satisfactorily smooth power transmission particularly in high speed operations.

Figure 3:
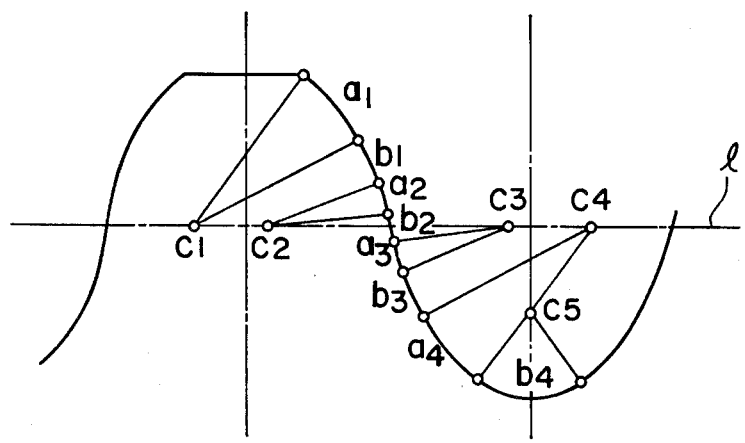
FIG. 3 illustrates the basic rack tooth profile of a form of W-N gear embodying the present invention, taken in a transverse or normal reference plane.
Figure 4:
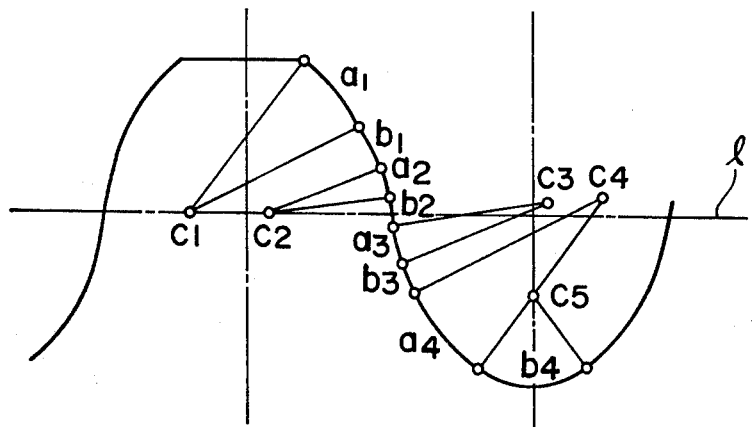
FIG. 4 is an illustration similar to FIG. 3, of another form of W-N gear embodying the present invention.

In order to overcome such difficulties as described above, the present invention provides a W-N gear having a tooth profile which includes a tooth flank formed of a plurality of circular arcs and an appropriate intermediate curved line or lines smoothly interconnecting the circular arcs and taking the form, for example, of a cycloid of a circular arc approximating thereto, as illustrated in FIG. 3 or 4.

Description will first be made in detail of the tooth profile shown in FIG. 3. The convex flank of the double-flank tooth profile is formed of convex circular arcs $a_1$ and $a_2$ and an intervening curve $b_1$, which interconnect circular arcs $a_1$ and $a_2$ smoothly merging therein at the opposite ends. The concave flank, lying below pitch line $l$, is formed of concave circular arcs $a_3$ and $a_4$ and an intervening curve $b_3$, which interconnects circular arcs $a_3$ and $a_4$ smoothly.

The circular arcs $a_1$, $a_2$, $a_3$ and $a_4$ have their respective centers $c_1$, $c_2$, $c_3$ and $c_4$ located on the pitch line $l$. The radii of circular arcs $a_1$ and $a_4$ are equal to each other while those of circular arcs $a_2$ and $a_3$ are smaller and equal to each other. It is to be noted that the two flanks are smoothly interconnected by an appropriate curved or straight line $b_2$. The bottom of the tooth space, not participating in meshing engagement, is defined by a circular arc $b_4$ of substantial radius centered at $c_5$.

The tooth profile of FIG. 4 is basically the same as that shown in FIG. 3 except that the circular arcs $a_3$ and $a_4$ of the concave flank have their respective centers $c_3$ and $c_4$ located more or less apart from the pitch line $l$, the radii of circular arcs $a_3$ and $a_4$ being larger than those of circular arcs $a_1$ and $a_2$, respectively.

As pointed out hereinbefore, with conventional W-N gears, the two flanks on either side of a tooth have each been formed of a single circular arc or a single curved line approximating thereto and, accordingly, in operation of a pair of such W-N gears, only a single local instantaneous contact has appeared along the length of tooth trace on each of the two flanks. In contrast to this, with the case of a pair of mating W-N gears having a tooth profile such as shown in FIG. 3 or 4, in which each flank is formed of a plurality of circular arcs separately centered, tooth contact is made on each flank at all times at a plurality of discrete locations spaced apart from each other in the direction of tooth trace in accordance with the spaced arrangement of the centers of the flank arcs.

The contact made at each of such locations, instantaneous in nature, is a line contact between circular arcs in cases such as shown in FIG. 3, in which the radii of circular arcs $a_1$ and $a_2$ of the convex flank are respectively equal to the radii of circular arcs $a_4$ and $a_3$ of the concave flank. On the other hand, in cases such as shown in FIG. 4, in which the radii of concave circular arcs $a_4$ and $a_3$ are greater than those of convex circular arcs $a_1$ and $a_2$, respectively, there arises a point contact between each pair of cooperating circular arcs, as indicated at $P_1$, $P_2$, $P_3$ and $P_4$.

Figure 5:
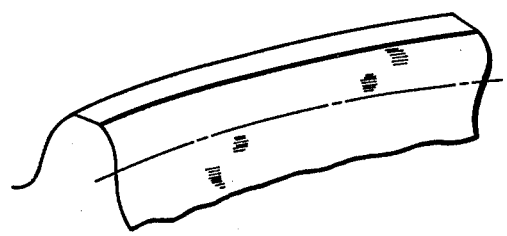
FIG. 5 is a view similar to FIG. 1, illustrating the instantaneous form of tooth contact of W-N gears of FIGS. 3 and 4.
Figure 6:
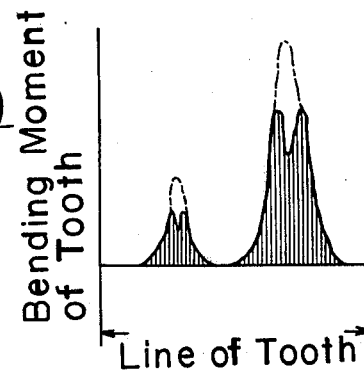
FIG. 6 is a graphic illustration similar to FIG. 2, of the bending moment acting on the root of the tooth shown in FIG. 5.

FIG. 5 illustrates an instantaneous state of tooth bearing obtainable with W-N gears of the present invention having the tooth profile of FIG. 3 or 4 after their tooth surfaces have been worn to smoothly fit one other. As illustrated, the tooth bearing appears in a pattern dispersed along the line of tooth trace and thus, in the embodiments described above, the circumferential force acting at any instant on a single tooth is supported at four locations thereon whereas with conventional W-N gears the number of such locations or load-bearing points has been at most two even if they are of the double-flank type. Further, according to the principle of the present invention, the number of load-bearing points on a single tooth can be readily increased to six or more, as desired, simply by increasing the number of circular arcs forming each tooth flank. In this manner, the peak values of bending moment appearing at the roots of the teeth can be materially reduced as illustrated in FIG. 6 and the concentration of bending stress at the tooth root accordingly can be alleviated.

The stress concentration can be further reduced by forming the bottom of the tooth space in a circular arc of substantial or short radius as in the case of conventional W-N gears in order to obtain a W-N gear having a tooth rooth strength much exceeding that of involute gears.

As regards the strength of tooth surface, though in some cases the sum of the lengths of circular arcs forming the tooth flank of the present invention might be more or less smaller than the arc length of a corresponding conventional single arc flank because of the curved line or lines interposed between adjacent circular arcs, it is possible in actual practice to obtain substantially improved surface strength by properly selecting the height or whole depth of a tooth and the radii of the circular arcs. Apparently, the surface strength depends not only upon the arc lengths but also upon other factors including arc radii and the pressure angle and, as the arcuate tooth forms are placed in sliding relation to each other, formation of oil films between tooth surfaces is a matter much more important than the length of flank arc or other tooth geometry. In this regard, particularly in the case of point-contact tooth engagement, the intervening line or lines serve as a kind of oil reservoir and their insertion rather forms a factor for increase in surface strength. In the case of line contact, the contact made on the intervening lines is a meshing engagement between convex and concave surfaces, as will be described later, and insertion of such intervening lines more or less contribute to the strength of tooth surface. Thus, in either case, point contact or line contact, W-N gears can be formed according to the present invention to exhibit a desired surface strength which is at least comparable to that of corresponding conventional W-N gears.

Though, in the embodiments of FIGS. 3 and 4, circular arcs $a_1$ and $a_4$ are larger in radius than respective circular arcs $a_2$ and $a_3$ with the arc centers $c_1$, $c_2$, $c_3$ and $c_4$ arranged along the pitch line in accordance with the respective arc radii, it is within the contemplation of the present invention to employ any other combination of arc radii. For example, it is contemplated that circular arcs arranged closer to the pitch line are made larger in radius than the remaining circular arcs. Further, it will be readily understood that the arc centers can be arranged in any suitable manner relative to each other and to the pitch line.

Though description has been made of a few forms of W-N gear of the double-flank type, it will be readily understood that the present invention is applicable to W-N gears of the single-flank type as well.

In practicing the present invention, it is not always necessary to form all the tooth flanks of a plurality of circular arcs and, for example, in the case of a double-flank type W-N gear, one of the two flanks may be formed in a single circular arc with the other flank formed of a plurality of circular arcs.

Description will next be made of another characteristic feature of the present invention, which is intended to improve the formation of oil films between tooth surfaces thereby to obtain a further increase in surface strength and load-transmitting efficiency of multiple-mesh W-N gears whose teeth are substantially increased in bending strength in the manner described hereinbefore.

Figure 7:
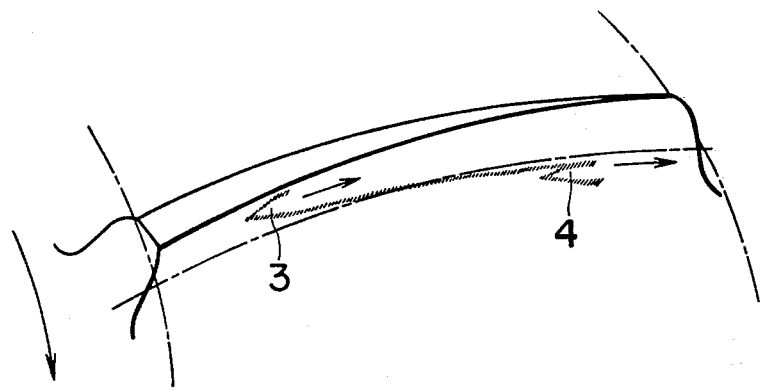
FIG. 7 is a fragmentary perspective view of another form of W-N gear embodying the present invention, illustrating an instantaneous form of tooth contact thereof.

According to this feature of the present invention, there is obtained on the tooth flanks, each formed of a plurality of circular arcs, an arrangement of contacts each of which is substantially in the form of V diverging in the direction of progress of meshing engagement, as illustrated in FIG. 7.

Figure 8:
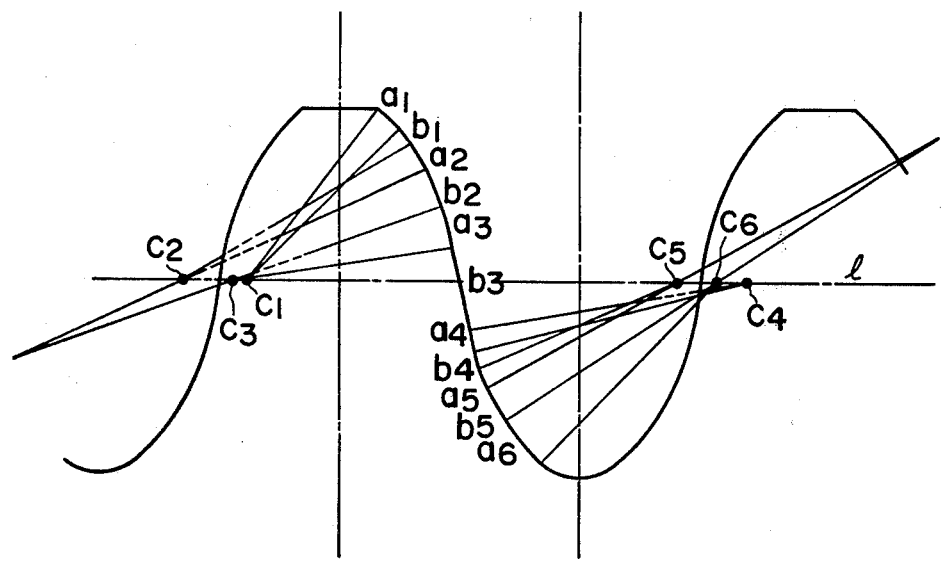
FIG. 8 is a diagram illustrating the basic rack tooth profile of the gear shown in FIG. 7, taken in a transverse or normal reference plane thereof.

FIG. 8 illustrates the basic rack tooth profile, taken in a transverse or normal reference plane, of another form of double-flank type W-N gear embodying the present invention and particularly its feature just described. As shown, the double flank of the tooth profile includes a convex flank formed of circular arcs $a_1$, $a_2$ and $a_3$ centered at $c_1$, $c_2$ and $c_3$, respectively, and straight or curved lines $b_1$ and $b_2$ interconnecting the circular arcs smoothly, a concave flank formed of circular arcs $a_4$, $a_5$ and $a_6$ centered at $c_4$, $c_5$ and $c_6$, respectively, straight or curved lines $b_4$ and $b_5$ smoothly interconnecting circular arcs $a_4$, $a_5$ and $a_6$, and an intermediate line $b_3$ interconnecting the convex and concave flanks. Centers $c_1$, $c_2$ and $c_3$ of the respective circular arcs $a_1$, $a_2$ and $a_3$ of the convex flank are more or less spaced from each other, lying on the pitch line $l$ at respective points arranged in the order of distance of the circular arcs from either end of the convex flank. Similarly, centers $c_4$, $c_5$ and $c_6$ of circular arcs $a_4$, $a_5$ and $a_6$ of the concave flank are spaced from each other, lying on the pitch line $l$ at respective points arranged in the order of distance of the circular arcs from either end of the concave flank.

As observed in such arrangement of arc centers, the centers $c_2$ and $c_5$ of medial circular arcs $a_2$ and $a_5$, respectively, of the convex and concave flanks are in a position shifted along the pitch line $l$ leftward from centers $c_1$ and $c_3$ and from centers $c_4$ and $c_6$, respectively, in cases where meshing engagement proceeds to the right, as illustrated in FIG. 7.

In such cases, it will be noted that occurrence of instantaneous contact of the convex flank on its circular arc $a_2$ is delayed relative to that on the other circular arcs $a_1$ and $a_3$ and, similarly, on the concave flank, the instantaneous contact of circular arc $a_5$ occurs later than that of other circular arcs $a_4$ and $a_6$. Accordingly, with the tooth profile of FIG. 8, there is obtained on each tooth flank an instantaneous contact 3 or 4, which is of V form diverging in the direction of progress of meshing engagement along the line of tooth trace, as illustrated in FIG. 7.

Owing to the instantaneous contacts 3 and 4, each in the form of V, not only the load on the tooth flanks is effectively distributed but also lubricating oil is wrapped in between the meshing tooth surfaces to form therebetween stable oil films of increased thickness. In this manner, any direct metal-to-metal contact between the tooth surfaces is effectively prevented and friction therebetween reduced to afford an improved efficiency of power transmission.

Incidentally, the tooth profile of the instant embodiment is not symmetrical with respect to the pitch point and this necessitates use of respective cutting tools for a pinion and a gear mating therewith. A single tool will suffice, however, if only either one of the convex and concave flanks is formed according to the present invention while the other flank is made in a standard tooth profile which is symmetrical with respect to the pitch point.

Further, it will be readily noted that, though in the embodiment of FIG. 8 all the centers of circular arcs are arranged on the pitch line $l$, they may alternatively be arranged in positions more or less spaced apart from the pitch line. It will also be readily understood that, though the embodiment of FIG. 8 represents an application of the present invention to a double-flank type W-N gear, the principle of the invention can also be applied to a single-flank type W-N gear with similar results.

A further characteristic feature of the present invention will next be described with reference to FIGS. 9 and 10.

Figure 9:
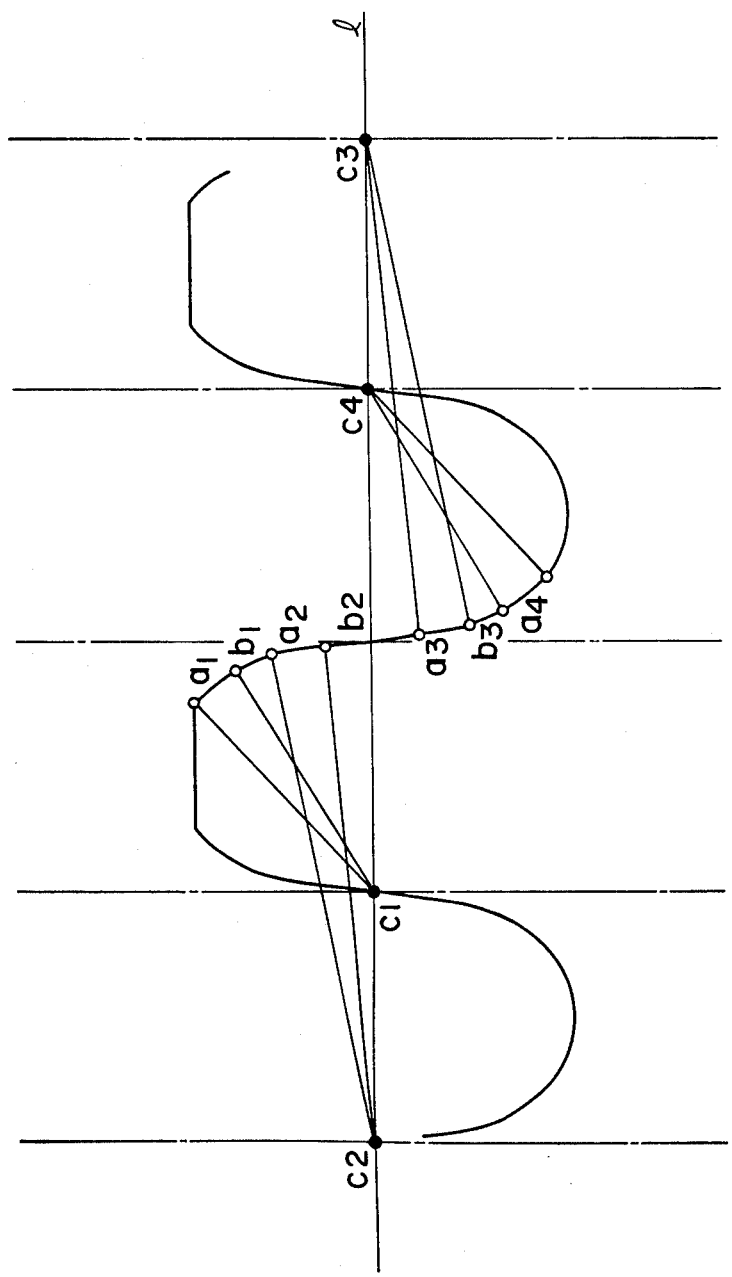
FIG. 9 is a diagram similar to FIG. 8, illustrating the basic rack tooth profile of a further form of W-N gear embodying the present invention.

In the tooth profile of FIG. 9, the convex flank is formed of two circular arcs $a_1$ and $a_2$, participating in meshing engagement, and an intervening curve line $b_1$, the centers $c_1$ and $c_2$ of respective circular arcs $a_1$ and $a_2$ being arranged on the pitch line $l$ or in the vicinity thereof and spaced from each other by a distance of approximately half the circular pitch. Similarly, the concave flank is formed of two circular $a_3$ and $a_4$, participating in meshing engagement, and an intervening curved line $b_3$, the centers $c_3$ and $c_4$ of respective circular arcs $a_3$ amd $a_4$ being also arranged on the pitch line $l$ or in the vicinity thereof and spaced from each other by a distance of approximately half the circular pitch. The convex and concave flanks are interconnected by an intermediate line $b_2$ and the distance between one of the centers $c_1$ and $c_2$ of the convex flank arcs $a_1$ and $a_2$ which is closest to the set of centers $c_3$ and $c_4$ of concave flank arcs $a_3$ and $a_4$ and one of the centers $c_3$ and $c_4$ which is closest to the set of centers $c_1$ and $c_2$ of convex flank arcs $a_1$ and $a_2$, that is, the distance between centers $c_1$ and $c_4$ is substantially equal to the circular pitch. It is to be understood that a W-N gear of such tooth profile operates at all times with at least three of its teeth meshing with the mating gear in cases where the face width is substantially equal to the axial pitch. FIG. 10 illustrates the state of meshing contact obtained at a certain instant in such cases.

Generally, where each tooth flank includes $n$ circular arcs the centers of which are arranged on the pitch line $l$ in a spacing of approximately $1/n$ the circular pitch, meshing contacts appear on the tooth flank successively at intervals of approximately $1/n$ the circular pitch, thus giving a highly balanced state of meshing engagement. In FIG. 10, reference character $t$ a indicates the length of tooth trace.

For example, where each tooth flank is formed of three circular arcs and their centers are arranged along the pitch line at intervals of ⅓ the circular pitch, contacts are obtained on the tooth flank at all times at intervals of ⅓ the axial pitch and accordingly, the load transmission between a pair of mating gears of such tooth profile is maintained in quite a well-balanced state. It is to be understood that, though FIG. 9 illustrates a tooth profile of a double-flank type W-N gearing, the principle of the present invention is also applicable to W-N gears of the single-flank type with similar results.

Figure 10:
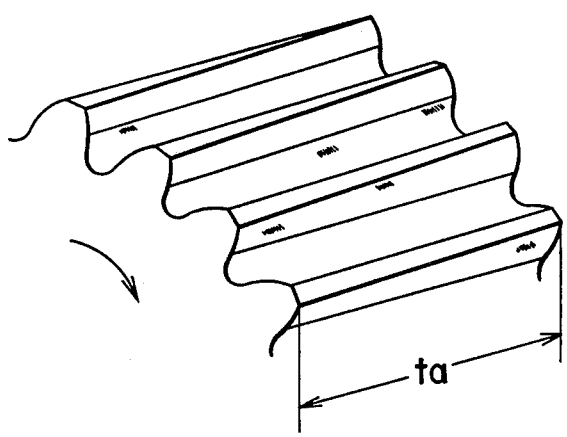
FIG. 10 is a fragmentary perspective view of the W-N gear of FIG. 9, showing an instantaneous state of tooth contact thereof.

Also, in the embodiment of FIG. 9, the distance between one of the centers of the convex flank arcs which is closest to the set of centers of concave flank arcs and one of the centers of the concave flank arcs which is closest to the set of centers of the convex flank arcs is approximately equal to the circular pitch and, as long as the number of convex flank arcs is equal to that of concave flank arcs, meshing contacts appearing on any two neighboring teeth are at all times in the same axial position, one on te convex flank and the other on the concave flank, as illustrated in FIG. 10. Such pairs of meshing contacts, appearing in succession are axially equally spaced from each other and, as a whole, a well-balanced state of meshing engagement is obtained.

Though in this embodiment the arc centers are arranged along the pitch line in a manner such that the least distance between the sets of centers of convex and concave flank arcs is substantially equal to the circular pitch of gear teeth, it will be readily understood that, generally in cases where both the convex and concave flanks are formed of a plurality ($n$) of circular arcs, meshing contacts appear in substantially the same manner as described with reference to FIG. 9, giving the same well-balanced state of meshing engagement, as long as the least distance between the sets of centers of the convex and concave flank arcs is so selected as to be substantially equal to $1/n$ the circular pitch multiplied by an integer.

A further characteristic feature of the present invention will next be described with reference to FIG. 11, which illustrates a further double-flank tooth profile embodying the invention.

As observed, the double flank of this embodiment includes a convex flank formed of two circular arcs $a_1$ and $a_2$, the centers of which are arranged on the pitch line $l$ at $c_1$ and $c_2$, respectively, and spaced apart from each other by a distance of one-half the tooth pitch, and an intermediate connecting line $b_1$. Similarly, the concave flank is formed of two circular arcs $a_3$ and $a_4$, the centers of which are arranged on the pitch line $l$ at $c_3$ and $c_4$, respectively, and spaced from each other by a distance of one-half the tooth pitch, and an intermediate line $b_3$. One, $c_1$, of the centers of convex circular arcs $a_1$ and $a_2$ which is closest to the set of centers $c_3$ and $c_4$ of concave circular arcs $a_3$ and $a_4$ and one, $c_4$, of the centers of concave arcs which is closest to the set of centers of convex arcs $a_1$ and $a_2$ are spaced apart from each other by a distance of approximately ¾ the tooth pitch. The convex and concave flanks are interconverted by an intermediate line $b_2$.

In a pair of meshing gears formed according to this embodiment, contacts appear alternately on the convex and concave flanks at intervals of approximately one-quarter the axial pitch, giving a well-balanced contact loading along th line of tooth trace and thus continuous and smooth power transmission is obtained even with a face width substantially corresponding to one-quarter the axial pitch.

Though the distance between arc centers $c_1$ and $c_4$ in this embodiment is ¾ the tooth pitch, it is to be understood that any other distance may be selected which is substantially equal to one-half the tooth pitch multiplied by an integer plus or minus one-quarter the tooth pitch.

Figure 12:
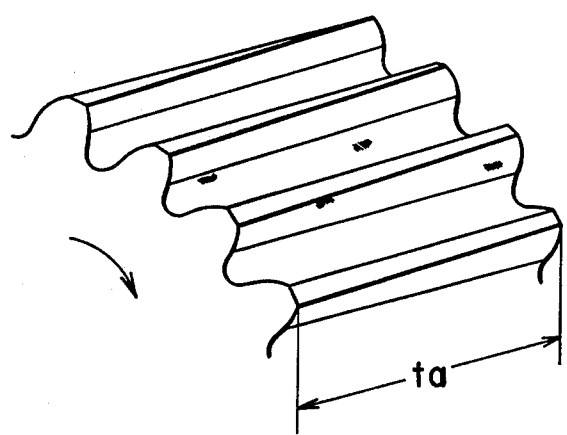
FIG. 12 is a view similar to FIG. 10, illustrating an instantaneous state of tooth contact of the W-N gear of FIG. 11.

Generally, in cases where each tooth flank is formed of $n$ circular arcs, the centers of which are arranged on the pitch line at intervals of $1/n$ the tooth pitch, if the set of centers of the convex circular arcs and that of the concave circular arcs are spaced apart from each other by a distance substantially equal to $1/n$ the tooth pitch multiplied by an integer plus or minus $\frac{1}{2}n$ the tooth pitch, meshing contacts appear in substantially the same manner as with the case of FIGS. 11 and 12, giving the same well-balanced state of contact loading.

The term "substantially" or "approximately" as employed herein in describing the distance between the set of centers of convex circular arcs and that of concave circular arcs generally means that the distance may be varied within a range of from about 0.8 to 1.2 times the specified value while ensuring continuous transference of instantaneous contacts between neighboring teeth with a face width selected at about 1.2 times the theoretical value to obtain smooth meshing engagement between mating gears.

Further, though, in the embodiments shown and described herein, flank-forming curves which participate in meshing engagement generally take the form of a circular arc, it will be apparent to those skilled in the art that they are not to be limited to such form but may also take the form of any other curved line approximating a circular arc according to the recent trend of tooth formation including an increasing variety of curve forms other than circular arcs. The foregoing description apparently applies also to such modifications only on the understanding that the centers of circular arcs cited therein represent respective centers of curvature of the flank-forming curves approximating a circulr arc.

Now, there is a problem to be considered in practicing the present invention. That is to say, there are chances of causing an undesirable state of meshing between convex surfaces, depending upon the arrangement of intermediate curves interconnecting a plurality of circular arcs of the convex or concave flank. Namely, in the tooth-generating process, the intermediate curves of the concave flank may possibly be made convex, resulting in an alternate arrangement of such convex curves and the concave circular arcs and hence meshing contact between convex surfaces. This is obviously undesirable, considering the machining and assembling accuracies required, the need of avoiding any deteriorated tooth bearing as resulting from deflection of the gear shift and teeth under load and the strength of tooth surface under line contact. In order to overcome these difficulties, it is desirable that the concave circular arcs generated on the lower tooth flank are interconnected by lines also of concave form.

Figure 13:
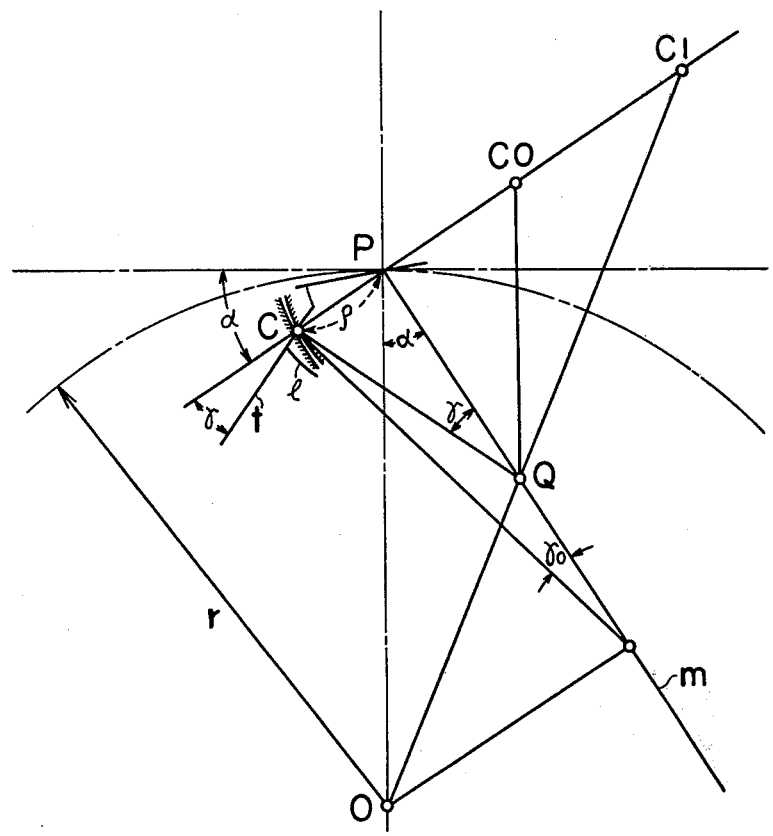
FIG. 13 is a diagram explaining the conditions for obtaining a desirable form of intermediate curved line usable between a plurality of circular arcs defining the tooth flank of a W-N gear embodying the present invention.

To attain this objective, the present invention proposes to employ the following method of tooth formation. Namely, in applying the well-known theory of tooth profile, the locus of a point of contact between an imaginary rack as represented by the tool employed and the tooth profile of a gear being cut is considered in a transverse reference plane, as illustrated in FIG. 13. With the case of a multiple-mesh W-N gear embodying the present invention, the path or locus of such point of contact takes the form a compound curve such as the line $l$ shown in FIG. 13, which is formed of circular arcs whose centers coincide with the pitch point P (when taken in a transverse reference plane) or curved lines approximating such circular arcs (when taken in a normal reference plane) and an intermediate curve interconnecting the circular arcs or curved lines. According to a further feature of the present invention, the intermediate curve of the path of point of contact, $l$, is laid out so as to meet the condition: $\gamma \geqq \gamma_o$, where $\gamma$ represents the angle between the tangent $t$ drawn to the intermediate curve at any point $c$ thereon and the straight line CP drawn from the point C through the pitch point P, and $\gamma_o$ is given by the following formula:

$$= \tan^{-1}(r \cos \alpha/\rho)$$

where $r$ represents the radius of pitch circle of the gear being cut, $\alpha$ represents the pressure angle at point C and $\rho$ represents the length of line segment $\overline{CP}$.

With this arrangement, the centers of curvature, $C_o$ and $C_1$, respectively, of such intermediate curve on the upper flank of the imaginary rack, represented by the tool employed, and such intermediate curve on the lower flank of the tooth being generated are found on the same side of the point C, as seen in FIG. 13, and thus the intermediate curve as obtained on the lower flank of the tooth being generated is concave in form. In this process, the centers of curvature $C_o$ and $C_1$ are each obtainable by a conventional construction method as follows. First, erect a perpendicular $m$ to the straight line CP at point P and a perpendicular to the tangent $t$ at point C. Then, a straight line is drawn from the point of intersection Q of the two perpendiculars in parallel with the straight line OP, O denoting the gear center. The point of intersection of the straight line so drawn with straight line CP is one of the required centers of curvature, $C_o$. Next, draw a straight line from the gear center O through the point of intersection Q and the point of intersection of this straight line OQ with straight line CP is the other required center of curvature $C_1$.

It will be readily appreciated from the foregoing description that, according to the present invention, the load to be transmitted between mating gear teeth is effectively dispersed along the line of tooth trace to alleviate any local concentration of bending stress and the peak values of bending moment are materially reduced. As the result, not only tooth breakage is effectively prevented but also variations of the tooth load and particularly changes in the load acting on any single tooth which occur at the beginning and end of each meshing contact are reduced to a substantial extent. This results in substantial reduction in vibration as well as in noise during operation and helps extend the load or speed range of W-N gears. Further, owing to the fact that a plurality of contacts are obtained at any instant along the line of tooth trace at equal intervals, the gears can serve satisfactorily under any load, smoothly transmitting rotation even with a face width smaller then that conventionally required.

Though the present invention has been shown and described principally in connection with helical gears, it is to be understood that the invention can also be applied to other kinds of gear such as bevel gears and skew gears with substantially the same results.

While several complete embodiments of the invention have been disclosed herein, it will be appreciated that modification of these particular embodiments of the invention may be resorted to without departing from the scope of the invention.

What is claimed is:

1. A pair of W-N gears in which the tooth profile of one gear is formed of a concave tooth flank and the tooth profile of a mating gear is formed of a convex flank, characterized in that each profile of said concave and convex tooth flanks, on a transverse or normal plane, is formed of substantially a plurality of circular arcs which are the main profiles in meshing, and intermediate curved lines interconnecting said circular arcs, the centers of said circular arcs being arranged on the pitch line or on points adjacent thereto.

2. A pair of W-N gears as claimed in claim 1, further characterized in that the centers of said circular arcs of each flank are arranged as the centers of circular arcs in the central portion of the flank are located in later position for the moving direction of the meshing contact relative to the centers of the other circular arcs.

3. A pair of W-N gears as claimed in claim 1, in which the tooth profiles of said concave and convex flanks are formed of $n$ circular arcs, the centers of which are arranged on the pitch line or on points adjacent thereto, at intervals on one-$n$ths of the circular pitch, and intermediate curved lines interconnect said circular arcs.

4. A pair of W-N gears as claimed in claim 1, further characterized in that each of said intermediate curved lines satisfies the condition: $\gamma \geqq \gamma_o$ in the relation between said intermediate curved line and the locus of a point of contact of mating tooth profiles on transverse plane, where $\gamma$ represents the angle between the tangent line $t$ to the said intermediate curve at any point C thereon being on said locus, and a straight line drawn from said point C through the pitch point P and $\gamma_o$ represents an angle given by the following formula:

$$= \tan^1 (r \cos\alpha/\rho)$$

where $r$, $\alpha$ and $\rho$ represent respectively the radius of the pitch circle of the gear, the pressure angle at the pitch point P and the length of segment PC.

5. A pair of W-N gears in which the tooth profiles of each gear are formed of a concave and a convex flank, characterized in that the tooth profile of the said concave flank of one gear and the said convex flank of the mating gear, on a transverse or normal plane, are formed of substantially a plurality of circular arcs that are the main profiles in meshing, and intermediate curved lines interconnecting said circular arcs, the centers of said circular arcs being arranged on the pitch line or on points adjacent thereto.

6. A pair of W-N gears as claimed in claim 5, further characterized in that the centers of the circular arcs of the concave flank of said one gear and the convex flank of said mating gear are respectively arranged as the centers of circular arc or arcs in the central portion of the flank are located in later position for the moving direction of the meshing contacts relative to the centers of the other circular arcs.

7. A pair of W-N gears as claimed in claim 5, in which the tooth profiles of the concave flank of said one gear and the convex flank of said mating gear are formed of $n$ circular arcs, the centers of which are arranged on the pitch line or on points adjacent thereto at intervals of one-$n$ths of the circular pitch, and intermediate curved lines interconnecting said circular arcs.

8. A pair of W-N gears as claimed in claim 5, further characterized in that each of the intermediate curved lines of the concave flank of said one gear and the convex flank of said mating gear satisfies the condition: $\gamma \geqq \gamma_o$, in the relation between each intermediate curved line and the locus of a point of contact of mating tooth profiles on transverse plane, where $\gamma$ represents the angle between the tangent line $t$ to the said intermediate curved line at any point C thereon being on the said locus and the straight line drawn from said point C through the pitch point P and $\gamma_o$ represents an angle given by the following formula:

$$= \tan^{-1}(r \cos \alpha/\rho),$$

where $r$, $\alpha$ and $\rho$ represent respectively the radius of the pitch circle of the gear, the pressure angle at the pitch point P and the length of segment PC.

9. A pair of W-N gears in which the tooth profiles of each gear are formed of a concave and a convex flanks, characterized in that the tooth profile of said each flank, on a transverse or normal plane, is formed of substantially a plurality of circular arcs that are the main profiles in meshing, and intermediate curved lines interconnecting said circular arcs, the centers of said circular arcs being arranged on the pitch line or on points adjacent thereto.

10. A pair of W-N gears as claimed in claim 9, further characterized in that the centers of said circular arcs of said concave flank of one gear and said convex flank of the mating gear are respectively arranged as the centers of circular arcs in the central portion of the flank are located in later position in the moving direction of the meshing contacts relative to the centers of the other circular arcs.

11. A pair of W-N gears as claimed in claim 9, further characterized in that the centers of said circular arcs of each flank are respectively arranged as the centers of circular arcs in central portions of the flank are located in later position in the moving direction of the meshing contacts relative to the centers of the other circular arcs.

12. A pair of W-N gears as claimed in claim 9, further characterized in that tooth profiles of said concave flank and said convex flank of each gear are formed on $n$ circular arcs, the centers of which are arranged on the pitch line or one points adjacent thereto at intervals of one-$n$ths of the circular pitch, and intermediate curved lines interconnecting said circular arcs.

13. A pair of W-N gears as claimed in claim 12, further characterized in that the minimum distance, in each gear, between the centers of said $n$ circular arcs of the concave flank and the centers of said $n$ circular arcs of the convex flank are equal to the integral multiples of one-$n$ths of the circular pitch.

14. A pair of W-N gears as claimed in claim 9, further characterized in that each of said intermediate curved lines satisfies the condition: $\gamma \geqq \gamma_o$, in the relation between said each intermediate curved line and the locus of a point of contact of mating tooth profiles on a transverse plane, where $\gamma$ represents the angle between the tangent line $t$ to the said intermediate curved line at any point C thereon being on the said locus and a straight line drawn from said point C through the pitch point P and $\gamma_o$ represents an angle given by the following formula:

$$= \tan^-(r \cos\alpha/\rho),$$

where $\gamma$, $\alpha$ and $\rho$ represent respectively the radius of the pitch circle of the gear, the pressure angle at the pitch point P and the length of segment PC.

* * * * *

UNITED STATES PATENT OFFICE
CERTIFICATE OF CORRECTION

Patent No. 4,051,745                    Dated October 4, 1977

Inventor(s) Shoichi Ishikawa

It is certified that error appears in the above-identified patent and that said Letters Patent are hereby corrected as shown below:

Column 7, line 41, after "circular", insert -- arcs --

Column 8, line 22, change "te" to -- the --

Column 9, line 40, change "circulr" to -- circular --

*Signed and Sealed this*

*Thirty-first* Day of *January 1978*

[SEAL]

Attest:

RUTH C. MASON
*Attesting Officer*

LUTRELLE F. PARKER
*Acting Commissioner of Patents and Trademarks*